United States Patent [19]

Aiba

[11] 4,236,064
[45] Nov. 25, 1980

[54] HIGH-ACCURACY TEMPERATURE CONTROL WITH HEAT RESISTANCE COMPENSATION

[75] Inventor: Masahiko Aiba, Nara, Japan

[73] Assignee: Sharp Kabushiki Kaisha, Osaka, Japan

[21] Appl. No.: 893,790

[22] Filed: Apr. 5, 1978

[30] Foreign Application Priority Data

Apr. 7, 1977 [JP] Japan .................................. 52-40087

[51] Int. Cl.$^2$ ............................................. H05B 1/02
[52] U.S. Cl. .................................... 219/497; 219/501; 323/75 N; 323/68
[58] Field of Search ................ 307/117; 219/490, 494, 219/497, 498, 499, 501, 492; 323/75 K, 75 N, 68, 19

[56] References Cited

U.S. PATENT DOCUMENTS

| | | | |
|---|---|---|---|
| 3,553,429 | 1/1971 | Nelson | 219/501 |
| 3,755,688 | 8/1973 | Hohler | 307/117 |
| 3,789,190 | 1/1974 | Orosy etal. | 219/497 |
| 3,831,003 | 8/1974 | Foerster | 219/497 |
| 4,007,684 | 2/1977 | Takano et al. | 338/22 R |
| 4,079,331 | 3/1978 | Pinckaers et al. | 219/499 |

Primary Examiner—Roy N. Envall, Jr.
Assistant Examiner—M. Paschall
Attorney, Agent, or Firm—Birch, Stewart, Kolasch & Birch

[57] ABSTRACT

In a temperature control having a heating element and a temperature sensor for sensing the temperature of an object being heated by the heating element and providing signals effective to control electric energy to be supplied to the heating element, there is provided compensator means for compensating for a variation in the temperature of the object which may be caused by heat resistance and other factors while transmitting heat from the heating element to the object. The temperature of the object is equivalent to a desired one without any influences of the heat resistance. In one preferred form, an operational amplifier having two input terminals is provided one connected to the temperature sensor such as a thermistor and the other connected to a reference potential representative of the desired temperature. An output terminal of the operational amplifier is connected to the heating element. A feedback loop is interposed between the output terminal and the reference input terminal of the operational amplifier for heat resistance compensation.

2 Claims, 3 Drawing Figures

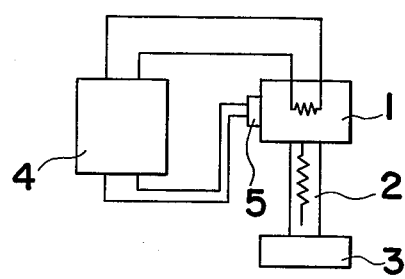
FIG. 1
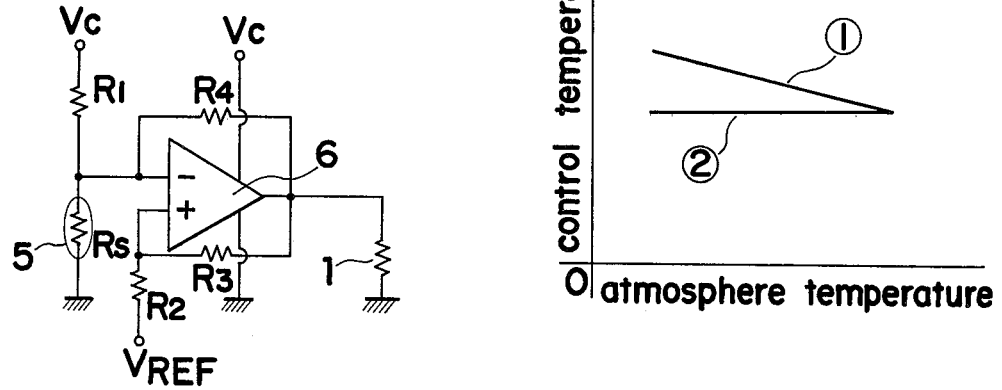
FIG. 2
FIG. 3

HIGH-ACCURACY TEMPERATURE CONTROL WITH HEAT RESISTANCE COMPENSATION

BACKGROUND OF THE INVENTION

The present invention relates to a temperature control capable of always keeping an object at a fixed temperature.

A typical example of a prior art temperature control involves employment of bimetal material whereby a mechanical contact is opened or closed to control power supply to a heater. It is also well known to use a temperature sensor such as a thermistor or a positive temperature characteristic thermistor to keep an object at a desired temperature.

These prior art temperature controls generally comprise a heating element adapted to heat an object and a temperature sensor (for example, a bimetal and a thermistor) adapted to control power supply to the heating element. A feed-back loop including the temperature sensor controls power supply to the heating element and keeps the object at a given temperature. Nevertheless, it is almost difficult to accurately maintain the object at the desired temperature because substantial heat resistance is present between the heating element and the object. A temperature increase or decrease in the object and even temperature detection will be timed-delayed due to the heat capacity of a heat transmission medium and the object and the heat resistance of the heat transmission medium. This makes a control system unstable and the gain of the control system relatively lower.

SUMMARY OF THE INVENTION

Accordingly, it is an object of the present invention to provide an improved temperature control which compensates for the heat resistance of a transmission medium in temperature-controlling the object via the heat transmission medium. In othe words, the temperature control embodying the present invention compensates for error due to the heat resistance while transmitting heat to the object by varying an amount of electric energy to be supplied to a heating element, and thus varying a reference temperature of its control system. This cancels the effects of the heat resistance.

BRIEF DESCRIPTION OF THE DRAWINGS

Other objects and many of the attendant advantage of the present invention will be reasily appreciated as the same become better understood by reference to the following detailed description which considered in conjunction with the accompanying drawings in which like reference numerals designate like part throughout the figures thereof, and wherein:

FIG. 1 is a schematic diagram of a temperature control system of the present invention;

FIG. 2 is a circuit diagram of the temperature control of the present invention; and FIG. 3 is characteristic curves for explaining operation of the temperature control circuit shown in FIG. 2.

DETAILED DESCRIPTION OF THE INVENTION

Referring now to FIG. 1 of the drawings, there is illustrated a temperature control system of the present invention. As well known in the art, a heating element 1 is thermally coupled with an object 3 to be temperature-controlled via a heat transmission medium 2. A control circuit 4 is connected details of which is viewed from FIG. 2. A temperature-sensitive element 5 is installed near the heating element 1. The object 3 will not be kept exactly at a desired temperature without the control circuit 4 of the present invention.

This is because the heat transmission medium 3 exhibits heat resistance and is susceptible to influences or the surrounding atmosphere. In the given example a well known thermistor $R_S$ having a positive temperature characteristic is employed as the temprature sensitive element 5, which shows a difference in the resistance thereof in proportion to a temperature difference.

In FIG. 2, an operational amplifier at its + input terminal is supplied via a resistor $R_2$ with a reference voltage $V_{REF}$ for establishing a desired or reference temperature. A − input terminal of the operational amplifier 6 is supplied with a voltage which develops at the junction of a resistor $R_1$ connected to a power supply source $V_C$ and the positive characteristic thermistor $R_S$. An output terminal of the operational amplifier 6 is connected to the heating element 1 of FIG. 1. The operational amplifier 6 controls power supply to the heating element 1 and therefore controls the temperature of the object 3. The output developing at the output terminal is applied to the − input terminal via a resistor $R_4$.

When the temperature of the heating element 1 is comparatively low, the thermistor $R_S$ shows a smaller resistance. While the voltage sought to be applied to the − input terminal of the operational amplifier 6 therefore attempts to fall, the function of the operational amplifier 6 is to increase substantially the output developing at the output terminal thereof and equalize the voltage applied to the − input terminal via the resistor $R_4$ with a fixed voltage being applied to the + input terminal. Under these circumstance the heating element 1 connected to the output terminal of the operational amplifier 6 consumes power to convert it into heat which in turn is supplied via the heat transmission medium 2 to the object 3.

An increase in the temperature of the heating element or the object causes a corresponding increase in the resistance of the thermistor $R_S$ and an increase in the voltage applied to the input terminal. The output at the output terminal of the operational amplifier 6 drops to lessen an amount of electric energy to be supplied to the heating element 1. When the reference temperature is reached, the voltage applied to the − input terminal amounts to the reference voltage $V_{REF}$ or more. The output of the operational amplifier 6 becomes almost zero. Precluding current from flowing through the heating element 1.

Although the temperature of the object 3 approaches the preselected reference temperature by the action of the operational amplifier 6, the temperature of the heating element 1 could neither be transmitted to the object 3 as it is nor could the object 3 be warmed to the preselected reference temperature because of the heat resistance of the heat transmission medium 2, the influences of the surrounding atmosphere, etc., as discussed previously.

As shown in FIG. 2, the output of the operational amplifier 6 is fed back to the + input terminal via the resistor $R_3$. The resistor $R_2$ and $R_3$ establish a positive feed back loop which is effective to change the reference voltage applied to the + input terminal and change substantially the reference temperature of the heating element. In the case where the temperature of the heating element is low, the voltage applied to the + input terminal is increased with an increase in the reference temperature of the heating element. When the temperature of the heating element rises in the immediate neighborhood of the reference one, the output of the operational amplifier 6 is reduced in a manner to equalize substantially the voltage applied to the + input terminal with the reference voltage $V_{REF}$.

Therefore, a proper selection of a ratio of $R_3/R_2$ in the positive feedback circuit makes it possible to keep the heating element and the object at a fixed temperature. Provided that the temperature of the heating element is selected higher than the reference temperature while predicting the heat resistance of the transmission medium 2, it is possible to keep the object 3 exactly at the reference temperature. In other words, a ratio of $R_3/R_2$ is so selected as to cancel the effects of the heat resistance of the heat transmission medium 2.

A proper selection of $R_3/R_2$ also makes the operational amplifier 6 adaptable to variations in the temperature of the surrounding atmosphere. As shown in FIG. 3, the reference temperature of the heating element is made lower ① when the temperature of the atmosphere is high and made higher when the temperature of the atmosphere is low. The temperature of the object ② is therefore kept constant despite variations in the temperature of the surrounding atmosphere. The control temperature is plotted as ordinate and the atmosphere temperature as abscissa in FIG. 2.

The ratio $R_3/R_2$ of the positive feedback circuit should be sufficiently large as compared with other circuit constants. This is to reduce an amount of the positive feedback (voltage) as small as possible. Needless to say, smaller heat resistance of the heat transmission medium 2 of FIG. 1 is preferable to ensure stable temperature control operation.

As stated above, the temperature control of the present invention serves to substantially make the heat resistance of the heat transmission medium, the influences of the surrounding atmosphere, etc., equivalent to zero in transmitting heat from the heating element to the object and making the temperature of the object constant. The present invention is most desirable to precision devices such as an ink jet printer as fully disclosed in U.S. Pat. No. 4,007,684 entitled INK LIQUID WARMER FOR INK JET SYSTEM PRINTER.

While a certain representative embodiment and details have been shown for the purpose of illustrating the invention, it will be apparent to those skilled in this art that various changes and modifications may be made without departing from the spirit or scope of the invention, and all such modifications as would be obvious to one skilled in the art are intended to be included within the scope of the following claims.

What is claimed is:

1. In a system for controlling the temperature of an object which is heated by a heating element separated from said object by a heat transmission medium, said heat transmission medium having a characteristic heat resistance, the improvement comprising:

temperature sensing means for sensing the temperature of said object being heted by said element through said heat transmission medium and providing output signals indicative of the temperature of said object;

comparator means having two input terminals and an output terminal, one of said input terminals being connected to said temperature sensing means and the other input terminal being connected to a voltage indicative of a preselectable reference temperature that said object is desired to reach, the output terminal of said comparator being connected to said heating element; and positive feedback circuit means connected between the output terminal of said comparator means and said other input terminal thereof, said positive feedback circuit means including resistance means, the value of said resistance means being so selected that the effects of said characteristic heat resistance of said heat transmission medium on the temperature of said object are canceled.

2. The temperature control system according to claim 1 wherein said comparator means is an operational amplifier.

* * * * *